US011041711B2

(12) United States Patent
Wang et al.

(10) Patent No.: US 11,041,711 B2
(45) Date of Patent: Jun. 22, 2021

(54) OPTICAL MEASUREMENT SYSTEM

(71) Applicants: Yu-Yen Wang, Taoyuan (TW); Bor-Jen Wu, New Taipei (TW); Chia-Bin Tsen, New Taipei (TW)

(72) Inventors: Yu-Yen Wang, Taoyuan (TW); Bor-Jen Wu, New Taipei (TW); Chia-Bin Tsen, New Taipei (TW)

( * ) Notice: Subject to any disclaimer, the term of this patent is extended or adjusted under 35 U.S.C. 154(b) by 0 days.

(21) Appl. No.: 16/528,945

(22) Filed: Aug. 1, 2019

(65) Prior Publication Data
US 2021/0033382 A1 Feb. 4, 2021

(51) Int. Cl.
*G01B 9/02* (2006.01)
*G02B 5/04* (2006.01)
*G02B 27/10* (2006.01)

(52) U.S. Cl.
CPC ..... *G01B 9/02091* (2013.01); *G01B 9/02041* (2013.01); *G02B 5/04* (2013.01); *G02B 27/106* (2013.01)

(58) Field of Classification Search
CPC .. G01B 9/02091; G01B 9/02041; G02B 5/04; G02B 27/106; A61B 3/102; A61B 5/0033; A61B 5/0073; A61B 2090/3735
See application file for complete search history.

(56) References Cited

U.S. PATENT DOCUMENTS

| 7,554,675 | B2* | 6/2009 | Takeshita | G01J 9/02 356/521 |
| 7,652,770 | B2 | 1/2010 | Edamatsu et al. | |
| 9,316,490 | B2 | 4/2016 | Aiyer | |
| 2011/0032536 | A1* | 2/2011 | Kuriyama | G01B 9/02022 356/512 |
| 2015/0092195 | A1* | 4/2015 | Blatter | A61B 5/6821 356/479 |
| 2020/0138283 | A1* | 5/2020 | Yamaguchi | A61B 3/0025 |

FOREIGN PATENT DOCUMENTS

TW 201723451 A 7/2017

\* cited by examiner

*Primary Examiner* — Michael P LaPage
(74) *Attorney, Agent, or Firm* — WPAT, PC

(57) ABSTRACT

An optical system includes a collimated light source, a beam splitter, two mirrors and two lenses, a focus lens, and a detector. An initial light beam is generated by the light source and then separated by the beam splitter into a first light beam and a second light beam. The two mirrors respectively direct the first and second light beams on a sample with symmetrical paths and the two lenses focus the first and second light beam on the sample respectively. The first and second light beams are reflected from the sample and along the counterpart paths to the beam splitter. An interfered light beam is then generated by combining the reflected first and second light beams, and focused by a focus lens on a detector. A Dove prism can be configured between one mirror and one lens of the two for contrast enhancement. It can produce the photon combination with same of direction in this setup to enhance contrast.

9 Claims, 12 Drawing Sheets

OPTICAL MEASUREMENT SYSTEM

FIELD OF THE INVENTION

The invention relates to an optical measurement system, and particularly to a method and a system for illuminating dual beams on a sample to generate a stronger interference.

BACKGROUND OF THE INVENTION

The following descriptions and examples are not admitted to be prior art by virtue of their inclusion in this section.

It is important to inspect a surface of micro structures in many current industries. For example, virus or some other contamination must be inspected for health consideration. Nano features and foreign objects must be inspected in semiconductor industry, in particular when the semiconductor process nodes approach 10 nm or below. For those micro or nano meter scaled objects to be inspected, electron microscopes are the most commonly used commercially available solutions. In biology or medical industries, cultivated viruses or red blood cells are taken from body by some invasion means and then prepared as a specimen so that viruses or red blood cells can be "seen" in vacuum environment of the electron microscopy. That means vivid virus or red blood cells can't be seen in any electron microscopy. Further, for the purpose of progress of the medical industry, it is valuable to see the vivid virus or red blood cells with non-invasion means.

Optical interference can be one of the mainstream non-invasive optical inspection systems for medical and biological industries. In the field of optical interference, interference occurs when path lengths of a reference beam and a scanning beam are coincident with each other. More specifically, interference generation condition is light source coherence length. When path length differences are shorter than light source coherence length, the optical interference will occur. Non-transparent specimens can be inspected by Michelson interferometer or Mirau interferometer. Transparent samples can also be measured by interferometry.

Michelson interferometer is one of the most commonly used configurations in the optical interferometry. By using a beam splitter, a light source is split into two paths. Both of the two light beams are reflected back toward the beam splitter which then combine and result in interference. The resulted interference pattern that is not directed back toward the source is typically directed to some type of photoelectric detector or camera. For different applications of the interferometer, the two light paths can be with different lengths or incorporate optical elements or even materials under test. Please refer to FIG. 1, a light source LS provides an initial light beam to a beam splitter BS which separates the initial light into two beams. One of the two beams is illuminated onto a sample S, and the other beam is illuminated into a mirror to form a reference path RP. After the two beams reflected back to the beam splitter BS, they will be combined and directed to a detector D and interferential patterns are thus generated on the detector D.

Mirau interferometer is another commonly used optical interferometry configuration. A Mirau interferometer works on the same basic principle as a Michelson interferometer. The difference between the two is in the physical location of the reference arm. The reference arm of a Mirau interferometer is located within a microscope objective assembly. Please refer to FIG. 2, a light source generates an initial light beam to a lens L which refracts the beam to a beam splitter BS to generate two beams. One beam is illuminated into a sample S and the other is reflected back to a half mirror HM on the lens L. Another optical system can be applied to combine the two beams to generate interference pattern. For example, if the sample S can be transparent, another optical system is configured below the sample S. If the sample S is non-transparent, an optical system with mirror to collect both beams should be configured above the sample S.

Although both Michelson interferometer and Mirau interferometer are very widely used, only one light beam is used to probe on the specimen, and interference is occurred by using the reference light beam. Therefore in both cases at most half of lights from the light source LS can reach sample surface. This significantly limits the capability of detecting fine features on the sample surface. Further, reference path is critical to the system which will incur complexity in the Michelson interferometers. Although interference result can be obtained by using the Mirau interferometers, in non-transparent specimen, due to back scattered light must be used for interference, optical intensity illuminated on the specimen is further reduced, and information of depth and thickness of the specimen can be easily lost.

Accordingly, it is necessary to build a new optical system such that it will be more advantageous to improve the interferometer than the prior art.

BRIEF SUMMARY OF THE INVENTION

The object of this invention is to provide a self-interfering technology that there is no reference path in the interferometer compared to conventional Michelson or Mirau interferometers. Thus, incident light intensity on the sample can be increased, and the amount of light incident on the sample is substantially higher than the other technologies.

The object of the present invention is to provide an equivalent path length for dual beams of the self-interfering technology. The equivalent path length in the present invention refers to the dual beams will travel the same path length from light source to the detector.

The object of the present invention is to irradiate or illuminate light beams on the sample with oblique incident for dark field image.

The object of the present invention is to provide a Dove prism for image contrast enhancement.

The object of the present invention is to provide a low coherent light source for optical coherence tomography (OCT).

The object of the present invention is to utilize a no reference arm configuration to achieve a vibration-proof structure for the interferometry.

The object of the present invention is to provide a full color image obtained by using the self-interfering technology.

Accordingly, the invention provides an optical system, which comprises a collimated light source for generating an initial light beam, a beam splitter for dividing the initial light beam into two comparable light beams and symmetrical to a splitting plane of the beam splitter, two mirrors and two lens, a focus lens, and a detector. The two mirrors and two lenses directs the two light beams and focus them onto a surface of the sample respectively to generate an interference pattern on the surface. The two mirrors and the two lenses receives two reflected light beams from the sample back to the beam splitter, thereby generating an interfered light beam by combining the two reflected light beams at the beam splitter. The focus lens focuses the interfered light beam on the detector to form an image.

In one embodiment of the optical system of the present invention, the splitting plane is normal to the sample surface.

In one embodiment of the optical system of the present invention, the system further comprises a Dove prism for inverting one of the two incident light beams before being focused on the surface, and inverting the other of the two incident light beams after being focused on the surface.

In one embodiment of the optical system of the present invention, the light source can be low-coherence light source.

In one embodiment of the optical system of the present invention, the light source can be coherence light source.

In one embodiment of the optical system of the present invention, the collimated light source provides a white initial light beam, and the optical system further comprises a dispersive optical element for dispersing the interfered white light into spectroscopic components, a pinhole array for picking up the spectroscopic components into a plurality of interfered beams, and a projection lens for projecting the interfered beams on the detector.

In one embodiment of the optical system of the present invention, the collimated light source provides a white initial light beam, and the optical system further comprises a dispersive optical element for dispersing the white light into spectroscopic components, a pinhole array for picking up the spectroscopic components into a plurality of beams, and a beam block for picking a specific beam with a specific wavelength from the plurality of beams.

In one embodiment of the optical system of the present invention, the collimated light source provides a plurality of light beams with different wavelengths.

In one embodiment of the optical system of the present invention, two paths of the two incident light beams are symmetrical to the splitting plane.

In one embodiment of the optical system of the present invention, the optical system further comprises a computer for processing information from the detector.

The present invention also provides an optical system which comprises a low coherent collimated light source for generating an initial light beam, a beam splitter receives the initial light beam to generate a first light beam and a second light beam, a first mirror directs the first light beam tilt incident to a surface region of a sample and a second mirror directs the second light beam tilt incident to the surface region of the sample, a first lens focuses the first light beam on the surface region and a second lens focuses the second light beam on the surface region, a Dove prism between the second mirror and the second lens, a focus lens, and a detector. The focused first light beam is reflected by the surface region along a path of the second light beam to the beam splitter, and the focused second light beam is reflected by the surface region along a path of the first light beam to the beam splitter, thereby generating an interfered light beam at the beam splitter. The focus lens focuses the interfered light beam on the detector to generate an image.

In one embodiment of the present optical measurement system, a first path of the first light beam is symmetrical to a second path of the second light beam.

In one embodiment of the present optical measurement system, a first path of the first light beam is equivalent to a second path of the second light beam.

The present invention also provides a method for illuminating a sample, which comprises steps of generating an initial collimated light beam; dividing the initial light beam into a first light beam and a second light beam; projecting and focusing the first and second light beams onto a surface region of the sample; inverting images of the second light beam and a reflected first light beam from the surface region; receiving the reflected first light beam and a reflected second light beam from the sample along a path of the second light beam and a path of the first light beam respectively; combining the reflected first and second beams to an interfered light beam; and focusing the interfered light beam to a detector.

In one embodiment of the present illuminating method, the light source is a low-coherent light source.

In one embodiment of the present illuminating method, the generating step provides a white initial light beam and the method further comprises steps of dispersing the white initial light beam into spectroscopic components; picking up the spectroscopic components into a plurality of beams with respective wavelengths; and selecting one of the plurality of beams to the beam splitter.

The present invention also provides a method for illuminating a sample, which comprises steps of generating a white initial collimated light beam; dividing the white initial light beam into a first light beam and a second light beam; projecting and focusing the first and second light beams onto a surface region of the sample; inverting images of the second light beam and a reflected first light beam from the surface region; receiving the reflected first light beam and a reflected second light beam from the sample along a path of the second light beam and a path of the first light beam respectively; combining the reflected first and second beams to an interfered light beam; dispersing the interfered light beam into spectroscopic components; picking up the spectroscopic components into a plurality of interfered beams with respective wavelengths; and projecting the plurality of beams to a detector.

In one embodiment of the present illuminating method, the light source is a low-coherent light source.

In one embodiment of the present invention, the method further comprises a step of combining each image of the plurality of interfered beams projected on the detector to form a full color image.

In one embodiment of the present illuminating method, a first path of the first light beam is symmetrical to a second path of the second light beam.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
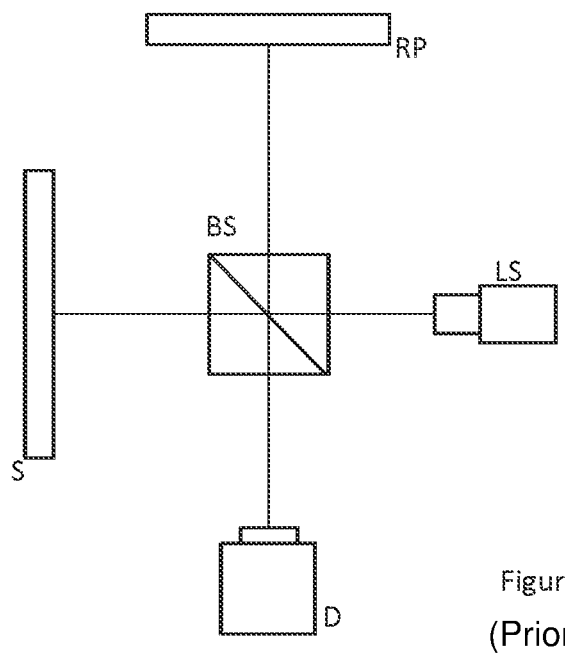
FIG. 1 is a schematic illustration of conventional Michelson interferometer.
Figure 2:
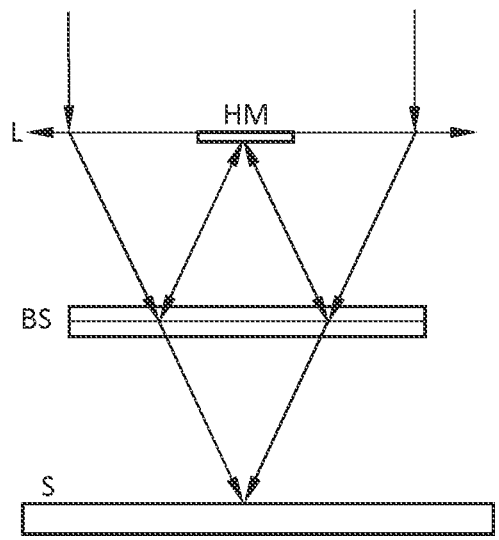
FIG. 2 is a schematic illustration of conventional Mirau interferometer.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention.

As used herein, the term "lens" generally refers to a transparent optical device to a light beam that focuses or disperses the light beam by means of refraction. Example of such a lens include, but are not limited to, focus lens, objective lens, and projection lens. Such lenses can be commonly found and/or processed in optical industry.

As used herein, the term "interferometer" or "interferometry" generally refers to an optical system in which optical waves or electromagnetic waves are superimposed to cause the phenomenon of interference, which is used to extract information.

As used herein, the term "coherence" generally refers to that two wave sources are perfectly coherent if they have a constant phase difference, the same frequency, and the same waveform. Optical coherence is the ability of light to generate interference, either temporal or spatial, and refers to the property of light of keeping the same behavior at different times or different places.

As used herein, the term "symmetry" generally refers to mirror symmetry such as two things are the same respect to a plane. For example, the two beams are symmetric if there is a symmetric plane such that the two beams are mirror symmetry. The first optical lens and mirror is symmetrical to the second optical lens and mirror if there is a symmetric plane.

As used herein, the term "equivalent path length" generally refers to two beams have the same travelling paths. In the present invention, two beams may experience different paths before arrive the sample. However, the two beams will have the same path length from light source to the detector.

As used herein, the term "sample surface" generally refers to an area on the sample illuminated by two beams. The micro structure of the sample surface may not be flat, but the sample surface in macro scale may be deemed flatness to the optical system of the present invention.

In the drawings, relative dimensions of each component and among every component may be exaggerated for clarity. Within the following description of the drawings the same or like reference numbers refer to the same or like components or entities, and only the differences with respect to the individual embodiments are described.

The present invention would be suitable for, but not limited to, biological and medical industry, for example skin detection. The exiting skin detector just has the function of detection for epidermis, and its optical characteristics have yet to be applied to bring about a new medical detector for three-dimensional images. Optical coherence tomography (OCT) is a 3D imaging modality based on light reflected back from within the sample and has become indispensable in biomedical applications with many advantages such as non-invasiveness, high resolution, high imaging speed, and relatively low cost. In this invention, low-coherence light source would be preferred for OCT due to too much unnecessary interference may be generated when Laser is applied to the biological and medical applications, and this new setup improves low coherence tomography technology, while conventional interferometers are not stable. In this art a new technology with self-interferometer is invented. It not only produces optical interference but also has doubled confocal characteristics. This new interferometry can combine the other technologies to achieve non-invasive medical image, such as high resolution endoscopy, 3D tomography, and blood glucose measurement, etc. It is also applicable to other fields when nano or micro critical characteristics are necessary to be inspected, such as defects/contaminations inspection and metrology in semiconductor processes. The sensitive characteristics of low coherence interference are improved, and the interference of the combined optical beams is stable for the high resolution image. This invention improves the sensitivity interferences of low coherence and stability.

In order to better understand the concept of the present invention, some optical elements are introduced first.

Figure 3:
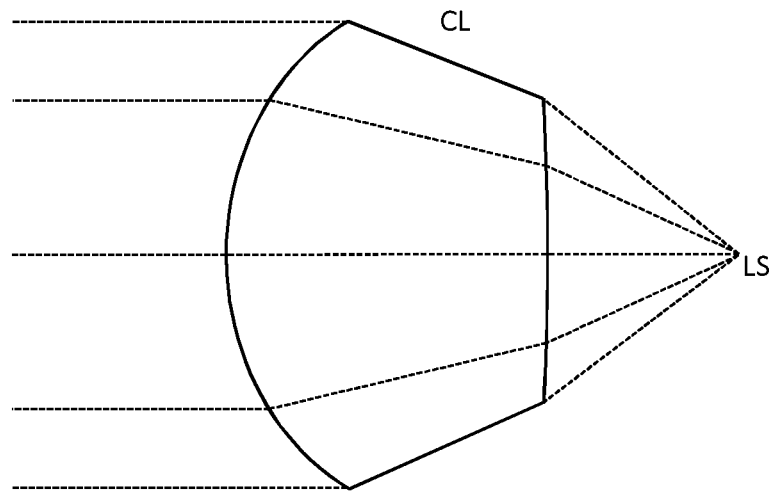
FIG. 3 is a schematic illustration of a collimation lens for the optical system of the present invention.

Please refer to FIG. 3, a collimated light source is generated when a collimated lens CL is configured to a light source LS. A collimated beam of light or other electromagnetic radiation has parallel rays, and therefore will spread minimally as it propagates. A perfectly collimated light beam, with no divergence, would not disperse with distance. Such a beam cannot be created, due to diffraction. Light can be approximately collimated by a number of processes, for instance by means of a collimator or collimated lens CL.

Perfectly collimated light is sometimes deemed to be focused at infinity. Thus, as the distance from a point source increases, the spherical wave fronts become closer to plane waves, which are perfectly collimated.

Unlike the prior arts, the light source in the present invention can be of low-coherence light source, such as LED (Light Emitting Diode), RCLED (Resonant Cavity LED), SLED or SLD (superluminescent diode) which is an edge-emitting semiconductor light source based on superluminescece. The light source in the present invention can be coherence or high-coherence light source, such as LASER, VECSEL. For the light source of low-coherence, the emitted light is usually generated isotropically, and thus a collimated lens of telocentric lens is provided to project a light source into infinity. Thus, a parallel beam can be generated.

Figure 4:
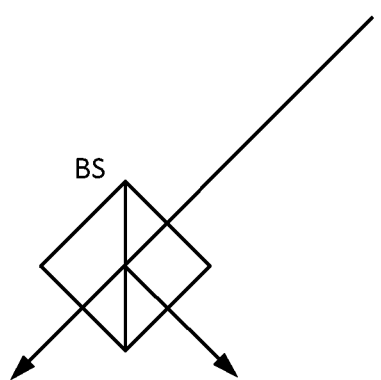
FIG. 4 is a schematic illustration of a beam splitter for the optical of the present invention.

Please refer to FIG. 4, a beam splitter (BS) is provided that an optical device splits a beam of light into two. It is a crucial part of most interferometers. In its most common form, a cube, is made from two triangular glass prisms, and preferred isosceles right triangle, which are glued together at their base using polyester, epoxy, or urethane-based adhesives. The thickness of the resin layer is adjusted such that (for a certain wavelength) half of the light incident through one "port" (i.e., face of the cube) is reflected and the other half is transmitted due to total internal reflection.

Figure 5:
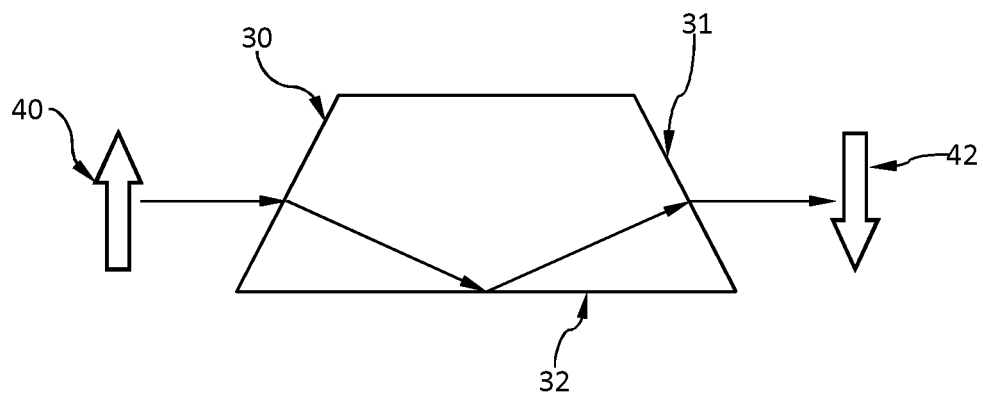
FIG. 5 is a schematic illustration of a Dove prism for the optical system of the present invention.

Please refer to FIG. 5, a Dove prism is provided to invert an image. Dove prisms are shaped from a truncated right-angle prism. A beam of light travelling parallel to the longitudinal axis, entering one of the sloped faces 30 of the prism undergoes one total internal reflection from the inside of the longest (bottom) face 32 and emerges from the opposite sloped face 31. Image 40 passing through the prism is flipped (mirrored) 42, and because only one reflection takes place, the image 40 is also inverted but not laterally transposed. Thus the Dove prism is used almost exclusively for images appearing at infinity.

In the present invention, self-interferometry can be generated by using the concept of the Bessel beam, in which two identical beams, generated or separated from a collimated coherence light beam, interfere with each other at sample surface. The interfered light beam will be reflected and illuminated on a detector such that an interference pattern can be obtained and imaged.

The collimated light source can also be LASER or LED. In the present invention, low coherence light source is preferred for the biological and medical industries. However, in some applications, the LASER is preferred.

The collimated light source is divided into two paths of beams by using a beam splitter in the present invention, and the two beams may be identical or nearly identical in intensity. The two divided beams will be directed onto the sample at a tilted incident angle to generate an interfered pattern by using mirrors and lenses respectively. The interfered pattern may be similar as the formation of Bessel beam. Then, the two beams will be reflected toward the counterpart path to the beam splitter, and will be merged and interfere with each other at the beam splitter again. The merged beam is then focused via a focus lens onto a detector to form images.

Various embodiments of the present invention will now be described more fully with reference to the corresponding drawings in which some example embodiments of the invention are shown. Without limiting the scope of the protection of the present invention, all the descriptions and drawings of the embodiments will exemplarily be referred to optical devices and flow charts with low-coherence light source. However, the embodiments are not be used to limit the present invention to specific low-coherence light source.

Figure 6:
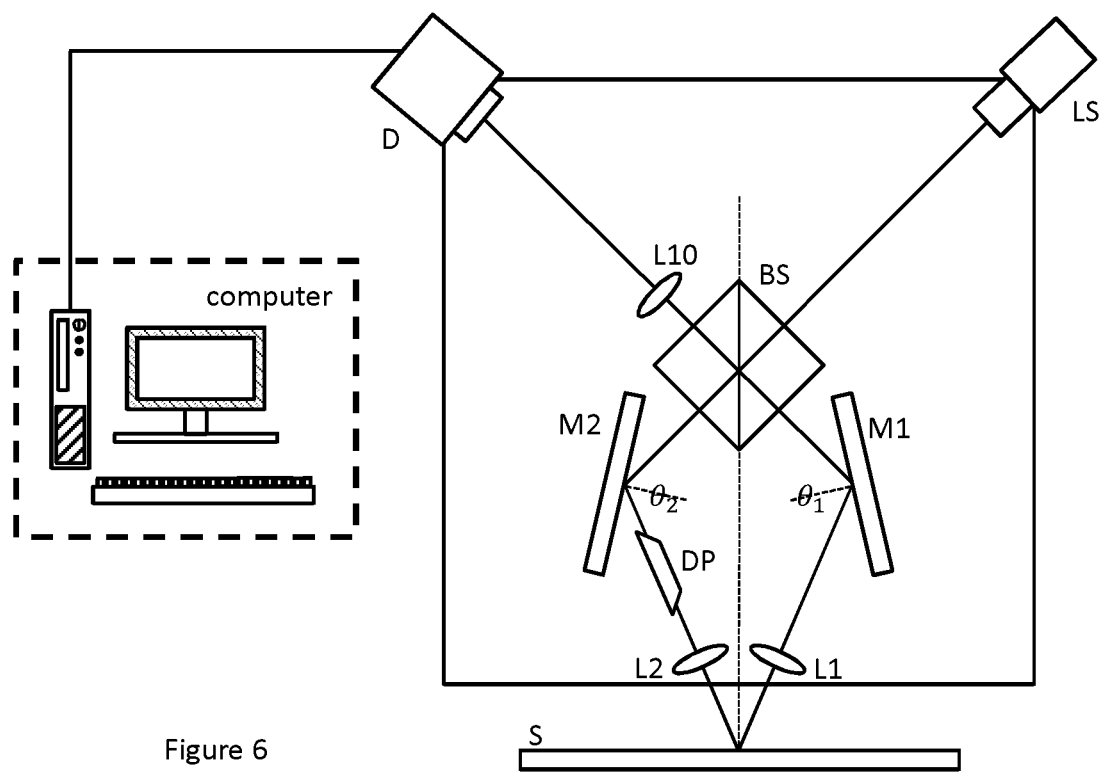
FIG. 6 is a schematic illustration of an optical system in accordance with one embodiment of the present invention.

Please refer to FIG. 6, a light source LS provides a collimated light beam to a beam splitter BS. Light source LS in the present invention would generate initial coherence light or low coherence light, such as LASER, SLD, or LED. The beam splitter BS then divides the initial light beam into a first light beam and a second light beam.

The first light beam is reflected by a first mirror M1 with a first angle θ1 and focused by a first lens L1 to a sample S. Then, the first beam is reflected back to a second mirror M2 to the beam splitter BS. The second light beam is reflected by the second mirror M2 with a second angle θ2 and focused by a second lens L2 to the sample S. The two lenses L1 and L2 will independently focus the first light beam and second light beam onto the sample S respectively to generate an interfered pattern on the sample S. Then, the second light beam is reflected toward the first mirror M1 to the beam splitter BS, while the first light beam is reflected toward the second mirror M2 to the beam splitter BS. In one embodiment of present invention, in order to keep the first path of the first beam symmetrical to the second path of the second beam which is the counter path of the first path, the first angle θ1 should be equal to the second angle θ2. The first angle θ1 and second angle θ2 should be varied accordingly such that angle of the first and second beam incident to the sample surface can be adjusted. The first angle θ1 and the second angle θ2 are combined incident and reflection angles and can be ranged from 45° to 135°. Further, the splitting plane of the beam splitter BS should be normal to the sample surface. Hence, the first beam path is symmetrical to the second beam path, or the first beam is symmetry to the second beam.

The incident angle of the first and second beams on the sample is tilted or inclined, and may be ranged from 0° to 90°. The image of the present self-interferometer is dark-field.

A Dove prism DP is configured between the second mirror M2 and the second lens L2 for image contrast enhancement. The Dove prism is a type of reflective prism which is used to invert an image. The Dove prism DP can also be configured between the first mirror M1 and the first lens L1.

The first beam and the second beam reflected back at the beam splitter BS will be merged and generate an interfered pattern at the beam splitter. The merged beam will be focused by a lens L10 to a detector D. The information received by the detector D will be processed by computer such that image can be obtained.

Detailed paths of individual beams in this optical system can be explained in FIG. 7. In FIG. 7A, some of the initial light beam from the light source LS may pass through the beam splitter BS to arrive the mirror M2 and reflected to sample S. Then, some of the beam may be reflected by the sample S to the mirror M1 and finally reflected back to the beam splitter BS to arrive the detector D. In FIG. 7B, some of the initial light beam from the light source LS may be reflected by the beam splitter BS to the mirror M1 first and reflected again by the mirror M1 to the sample S. Some of the beam may be then reflected by the sample S to the mirror M2 and again reflected by the mirror M2 to the beam splitter BS. Then, the beam will be reflected by the beam splitter to the detector D.

Figure 7A:
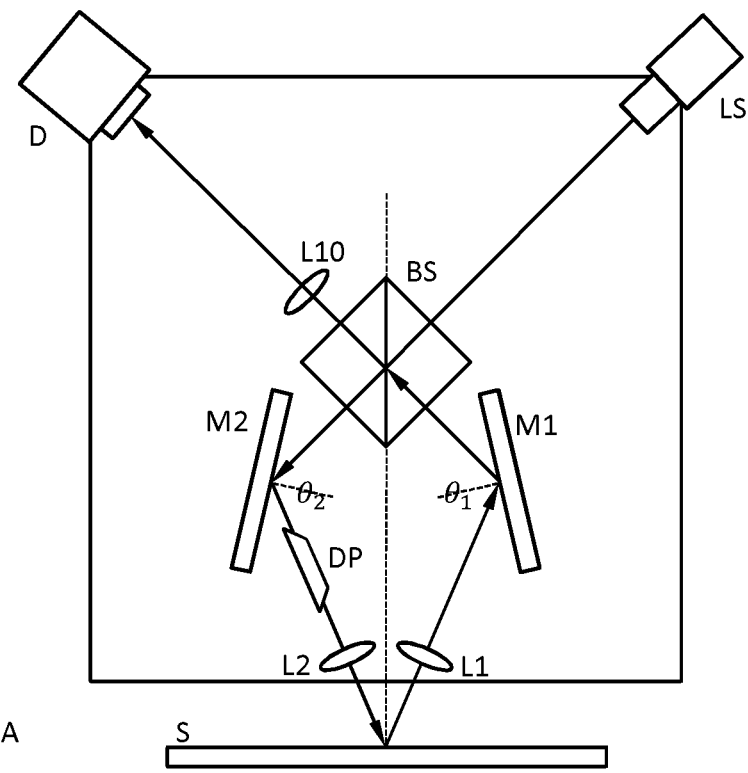
FIG. 7A to FIG. 7D are schematic illustration of each path of individual light beams in the optical system in accordance with one embodiment of the present invention.
Figure 7B:
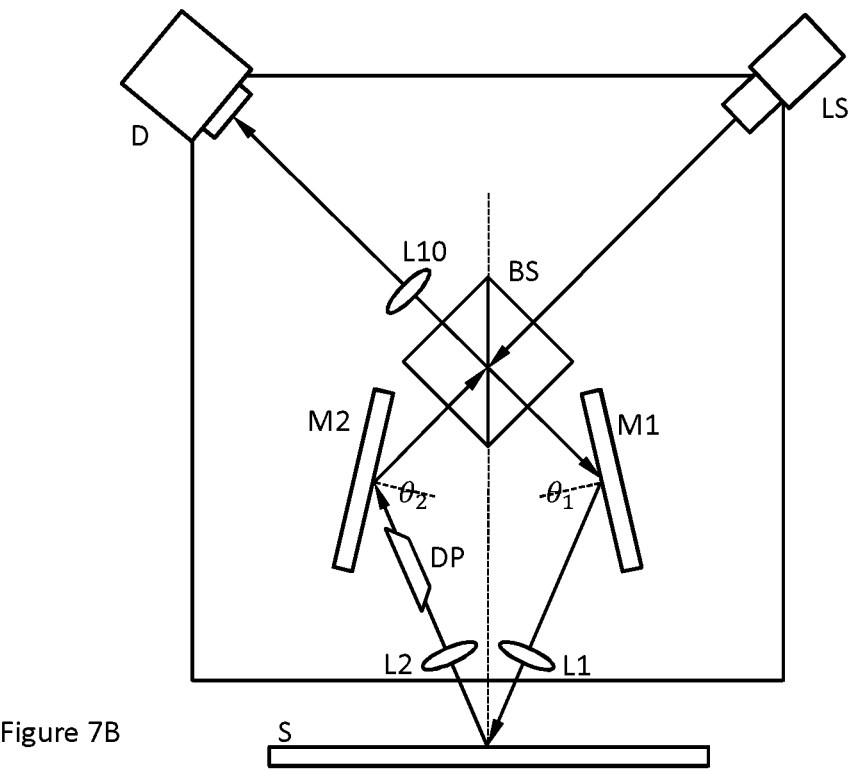
Figure 7C:
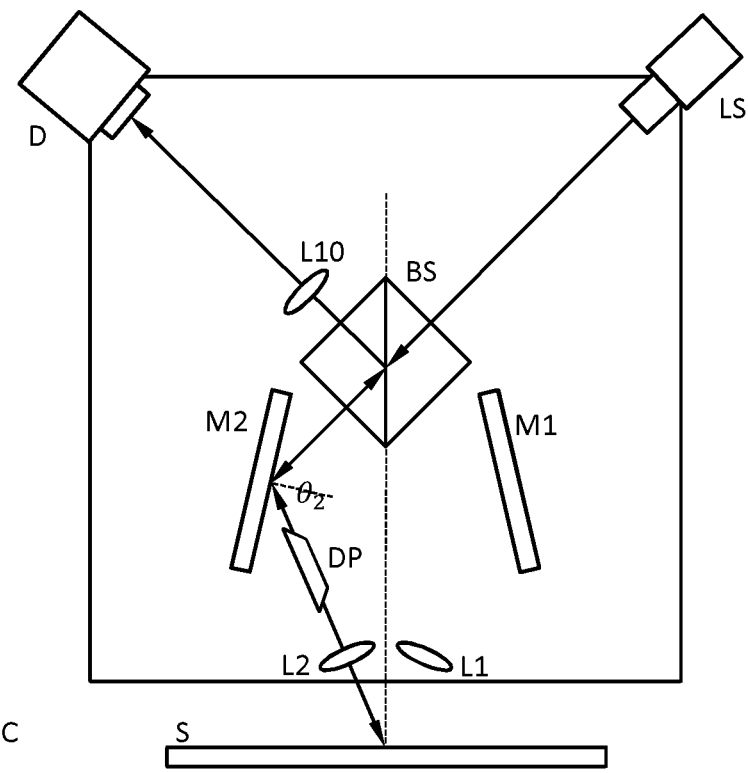
Figure 7D:
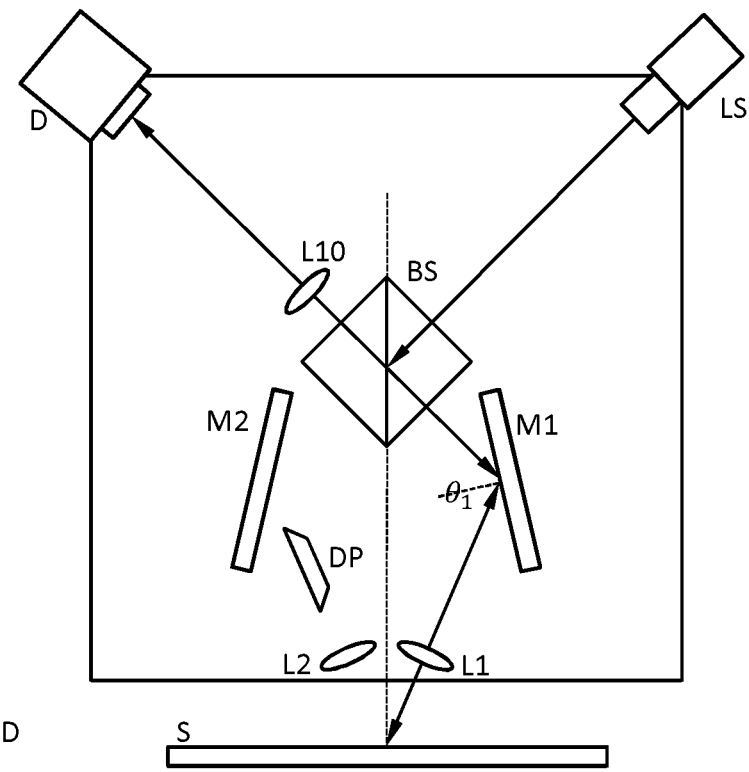

In FIG. 7C, some of the initial light beam from the light source LS may pass through the beam splitter BS to the mirror M2 and reflected by the mirror M2 to the sample S. However, unlike the beam-path in FIG. 7A, some of the light beam may be reflected back by the sample S along the original path to the mirror M2 and reflected to the beam splitter BS to arrive the detector D. In this drawing, the light beam does not travel to the mirror M1. In FIG. 7D, some of the initial light beam from the light source LS may be reflected by the beam splitter BS to the mirror M1 and reflected to the sample S. Similar to the beam-path in FIG. 7C, the light beam may be reflected back by the sample S along the original path to the mirror M1 and reflected by the mirror M1 again to the beam splitter BS to arrive the detector D.

Figure 8:
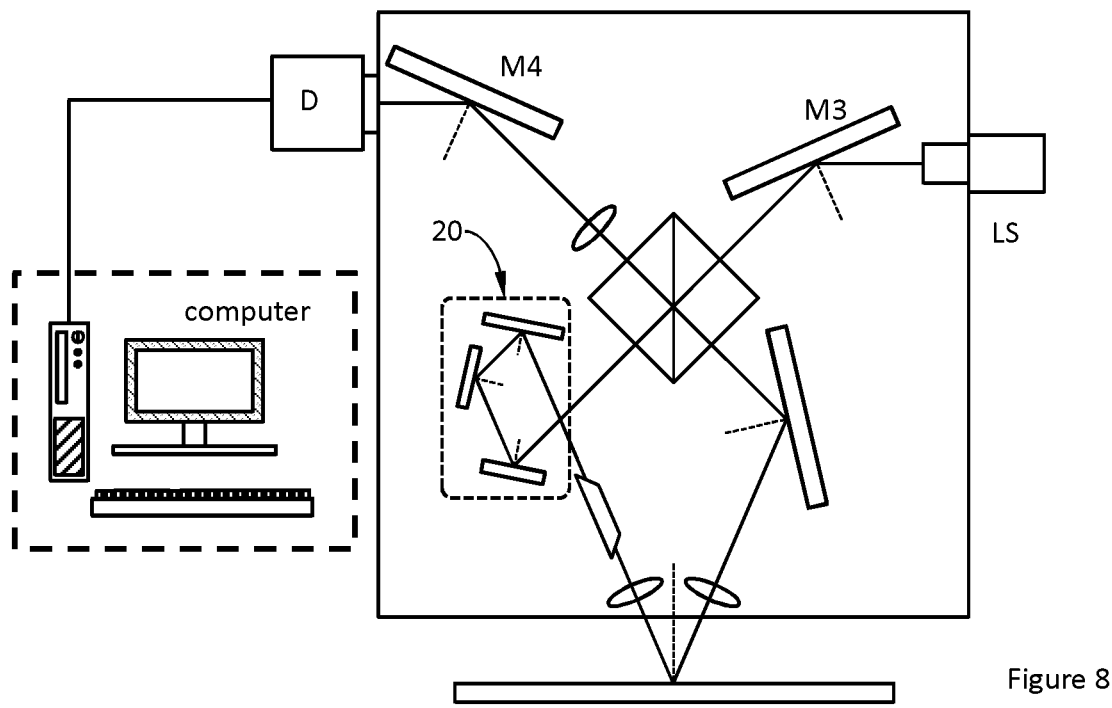
FIG. 8 is a schematic illustration of an optical system in accordance with one embodiment of the present invention.

Another embodiment of the present invention can be referred to FIG. 8. Two mirrors M3 and M4 are configured such that light source LS and detector D can be configured in a better position for commercial concern. Further, a set of mirrors 20 can be optionally configured to increase path length of the second beam for some particular applications, if the interference is generated with different path lengths. In this embodiment, the two beams will have equivalent path length.

Figure 9:
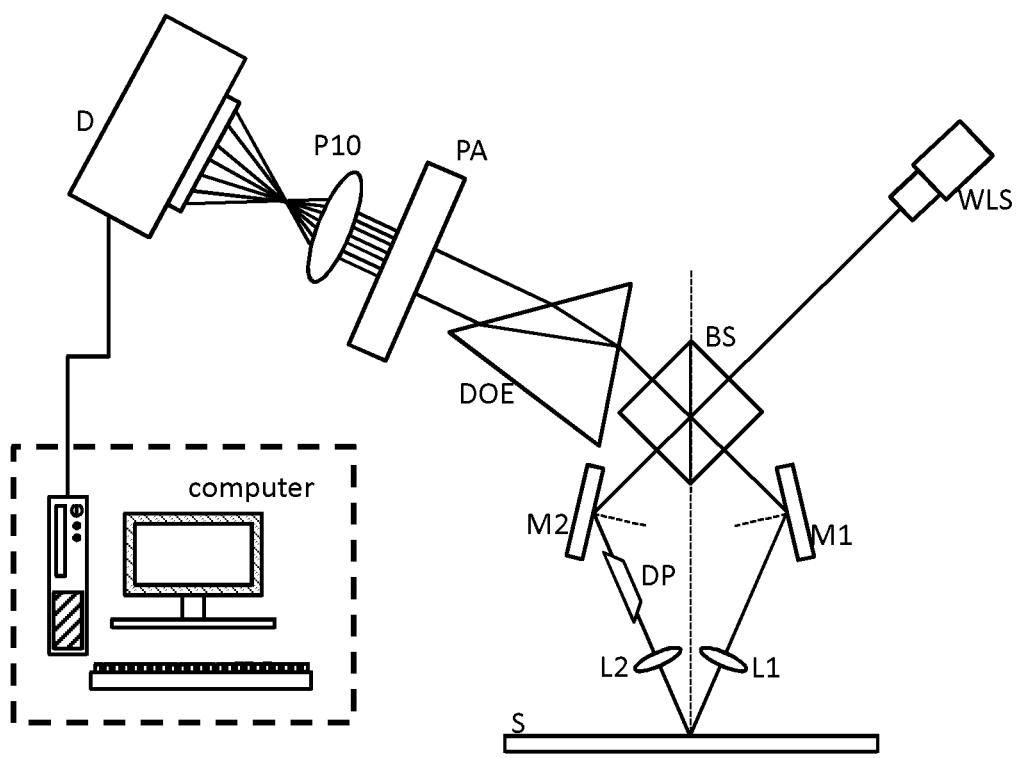
FIG. 9 is a schematic illustration of an optical system with white light source in accordance with one embodiment of the present invention.

Another embodiment of the present invention for full color image can be referred to FIG. 9. A white light source WLS is provided in the present invention. The white light source can be prepared by using a blue LED combined with yellow phosphor, Halogen lamp, Deuterium lamp, or gas-discharge lamp. It is important for biological and medical applications. For example, some tissues may present specific color when infected by virus or lack of some important chemicals. Then, after the two reflected beams are merged at the beam splitter, a dispersion optical element DOE is configured to disperse the white light beam into several spectroscopic components or individual monochromatic light beams. Then a pinhole array PA is provided to sample every monochromatic light beam individually. Then, a projection lens P10 is provided to project each monochromatic light beam into detector D. The information received by the detector D is processed by a computer. In this embodiment of the present invention, a full color image can be obtained when all images of each individual monochromatic light beam are superimposed. For example, vivid images of live cells, such as red blood cells, can be obtained by the present invention instead of conventional grey level image by using electron microscopy.

Figure 10A:
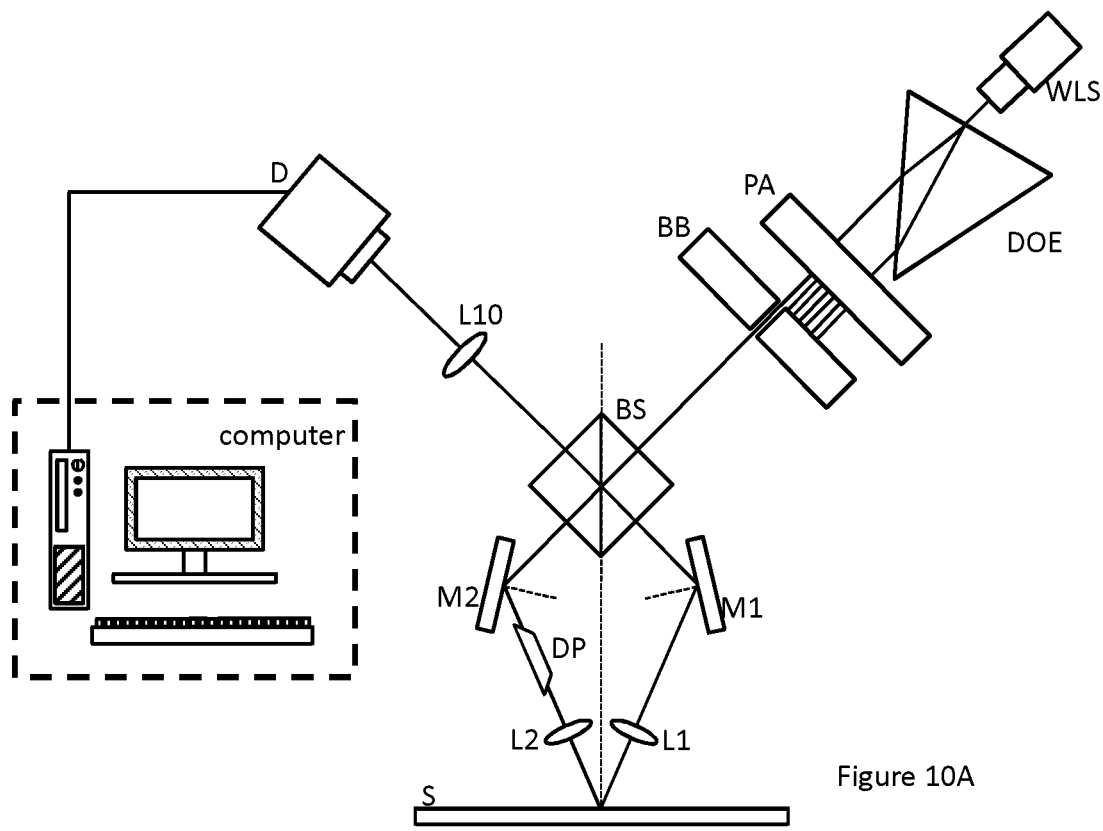
FIGS. 10A and 10B are schematic illustrations of an optical system with white light source in accordance with another embodiment of the present invention.
Figure 10B:
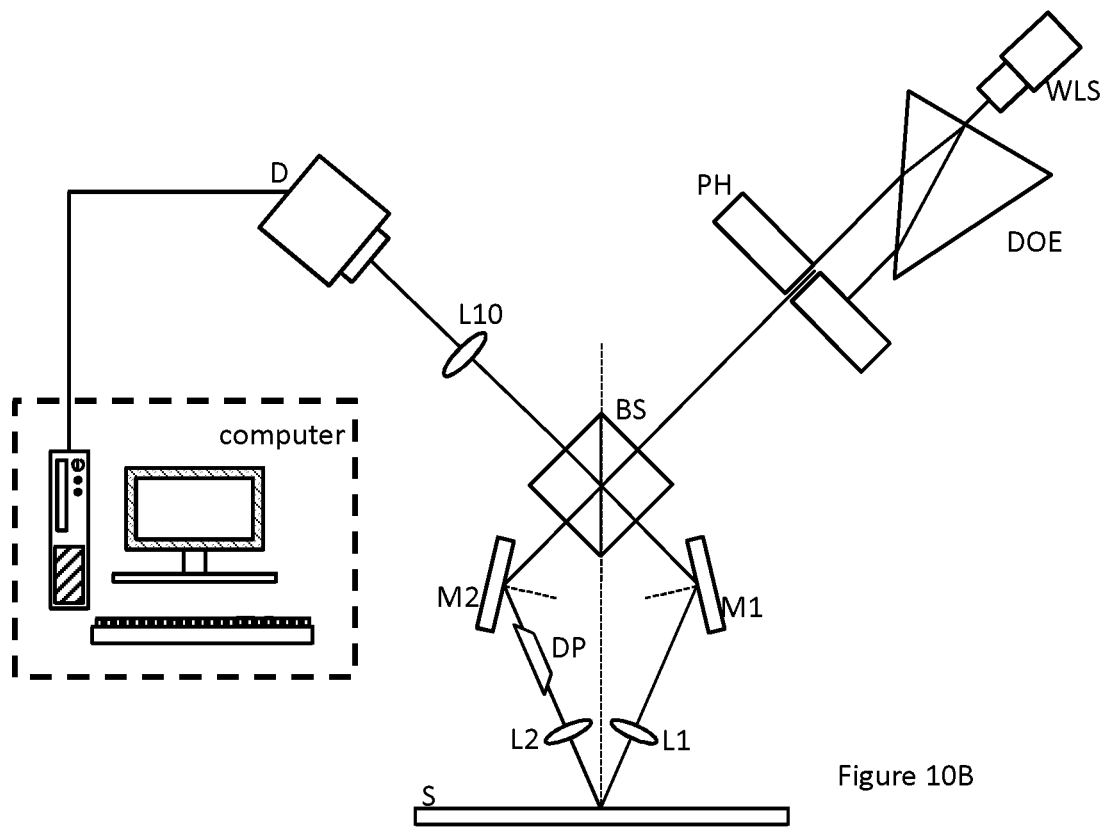

Another embodiment of the present invention for full color image can be referred to FIG. 10A. In this embodiment, the dispersion optical element DOE is configured such that white light beam emitted from the white light source WLS will be dispersed immediately. Then a pinhole array PA is provided to sample each monochromatic light beam individually. A beam block BB is provided to pick up a specific beam with a specific wavelength to be passed therethrough. Another embodiment of the present invention is to use single pinhole PH instead of pinhole array PA, as shown in FIG. 10B. After an image of the specific beam is processed, another beam is selected by the pinhole PH till all images of all beams are processed. Thus, a full color image can be obtained.

Figure 11A:
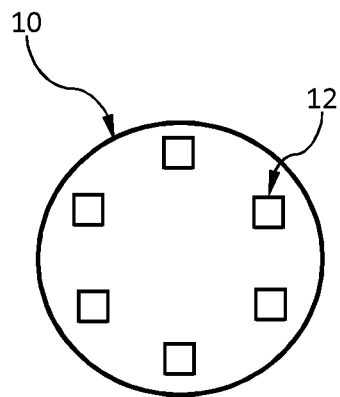
FIGS. 11A and 11B are schematic illustrations of multiple LED with different wavelengths as light source in accordance with another embodiment of the present invention.
Figure 11B:
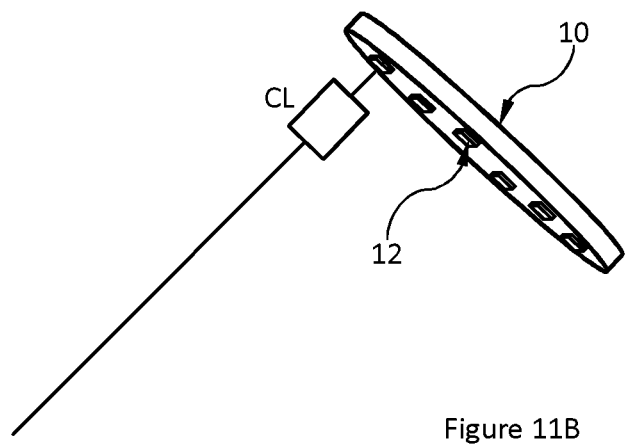

Still another embodiment of the present invention for full color image can be referred to FIG. 11A and FIG. 11B. The light source comprises several LEDs 12 of different wavelengths on a board and a collimation lens CL is provided. The multiple LEDs 12 at least include red, green, and blue LED, and can further include other LED that can be properly designated to cover the full visible spectrum or beyond if necessary, such as yellow light LED, cyan light LED, orange LED, and even UV LED. The board in can be rotated or indexed such that every LED 12 can be provided as light source for the embodiment in FIG. 6. After all images of every LED is processed and combined, a full color image can be obtained.

For some patterns with characteristic dimension less than resolution of visible light, the color is not defined, because the red, green and blue lights correspond to the human cone cell and such small patterns can't be seen by using visible light. For example, most viruses are seen by using electron microscopy and an image of a virus always shows grey level pattern. However, in the present invention, if the interference pattern is processed into an image with white light source or multiple light sources with different wavelengths, a full color image can be obtained even the features or patterns in the image is under resolution of visible light. It is because the patterns or features can be presented by computation of the interference patterns of the patterns or features. Similarly, different responses will be shown in the image when variant wavelengths are illuminated on different materials or surface characteristics. Different absorptions and reflections can be revealed by different wavelengths illuminating different materials, surface roughness, or structure. The full color image thus can provide more information.

Figure 12:
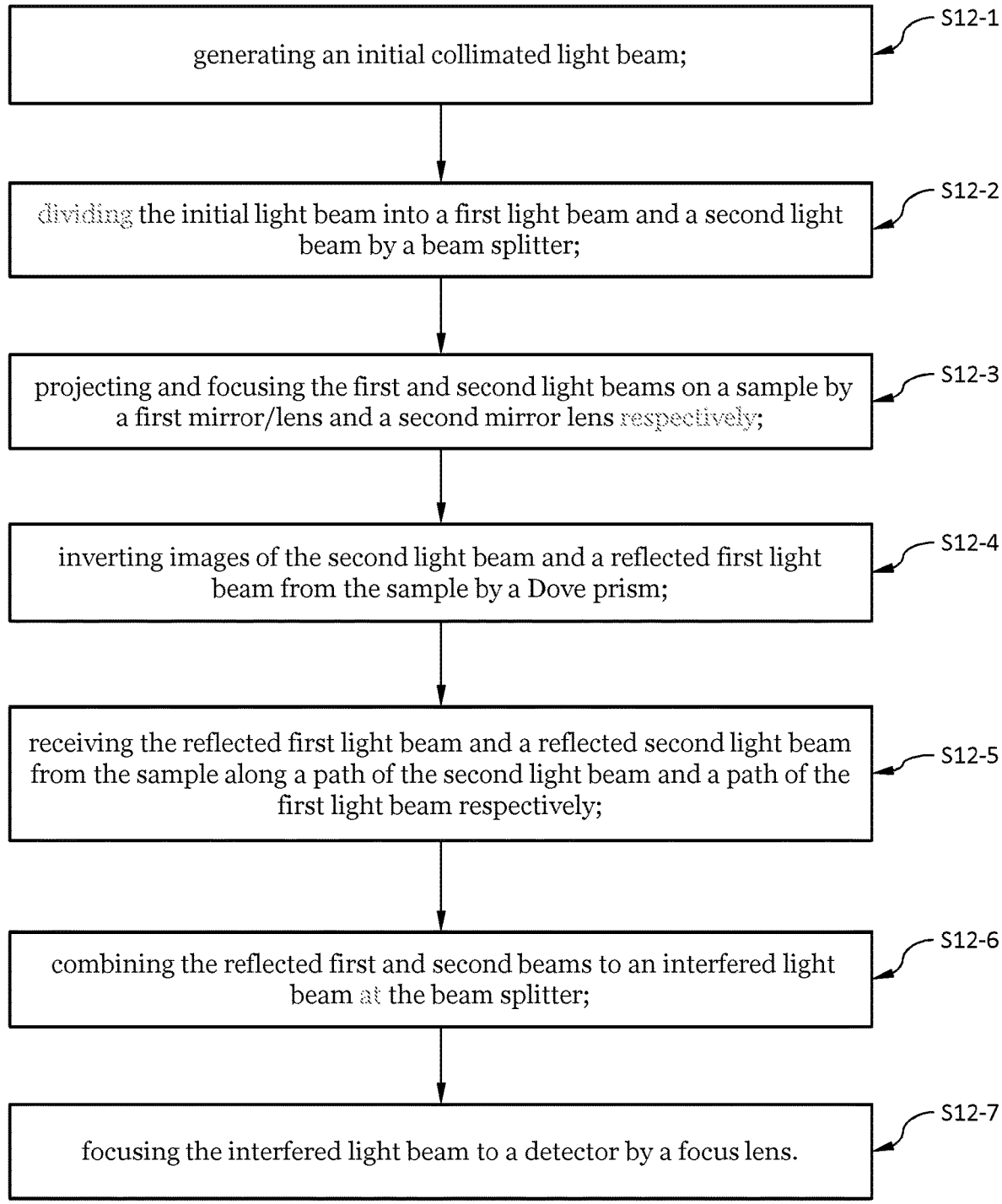
FIG. 12 is a flow chart showing the steps of a method for illuminating a sample in accordance with one embodiment of the present invention.

The operation of the optical system or self-interferometer provided in the present invention, such as embodiment in FIG. 6, can be referred to FIG. 12. First, an initial collimated light beam is generated as shown in step S12-1. Then, the initial light beam is divided into a first light beam and a second light beam by using a beam splitter, as shown in step S12-2. Next, the first and second light beams are projected and focused onto a sample by a first and second mirror/lens respectively, as shown in step S12-3. Images of the second light beam and the reflected first light beam from the sample are inverted by a dove prism, as shown in step S12-4. The first light beam and the second light beam are reflected toward the path of the second light beam and the path of the first light beam respectively, as shown in step S12-5. Then, the reflected first light beam and the reflected second light beam are combined or merged at the beam splitter, as shown in step 12-6. The combined, interfered light beam is then focused onto a detector by a focus length, as shown in step S12-7.

Figure 13:
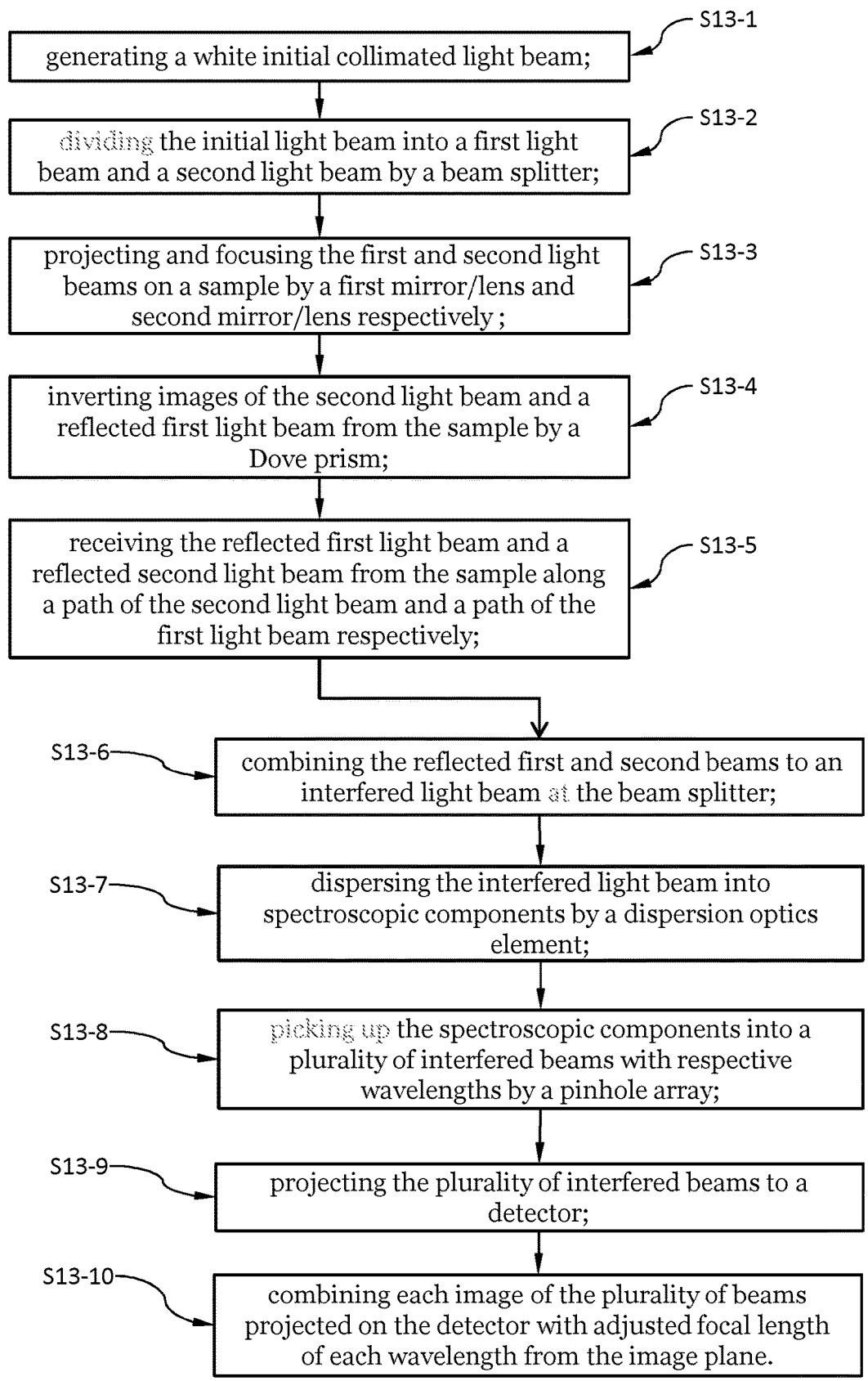
FIG. 13 is a flow chart showing the steps of a method for illuminating a sample by white light source in accordance with one embodiment of the present invention.

The operation of the optical system or self-interferometer by using a white light source, such as embodiment in FIG. 9, in the present invention can be referred to FIG. 13. A white initial collimated light beam is generated first as shown in step S13-1. The white initial light beam is divided into a first light beam and a second light beam by a beam splitter, as shown in step S13-2. The first and second light beams are projected and focused onto a sample by a first and second mirror/lens respectively, as shown in step S13-3. Images of the second light beam and reflected first light beam from the sample are inverted by a Doze prism, as shown in step S13-4. The first light beam and the second light beam are reflected toward a path of the second light beam and a path of the first light beam respectively, as shown in step S13-5. The reflected first light beam and the reflected second light beam are combined or merged at the beam splitter, as shown in step S13-6. The combined light beam is dispersed in spectroscopic components or individual chromatic light beams by a dispersion optics element, as shown in step S13-7. The spectroscopic components or individual chromatic light beams are pickup into a plurality of interfered beams with respective wavelengths by a pinhole array, as shown in step S13-8. The plurality of interfered beams is projected onto a detector, as shown in step S13-9. Each image of the plurality of beams projected on the detector is combined or superimposed with adjusted focal length of each wavelength from the image plane, as shown in step S13-10.

Figure 14:
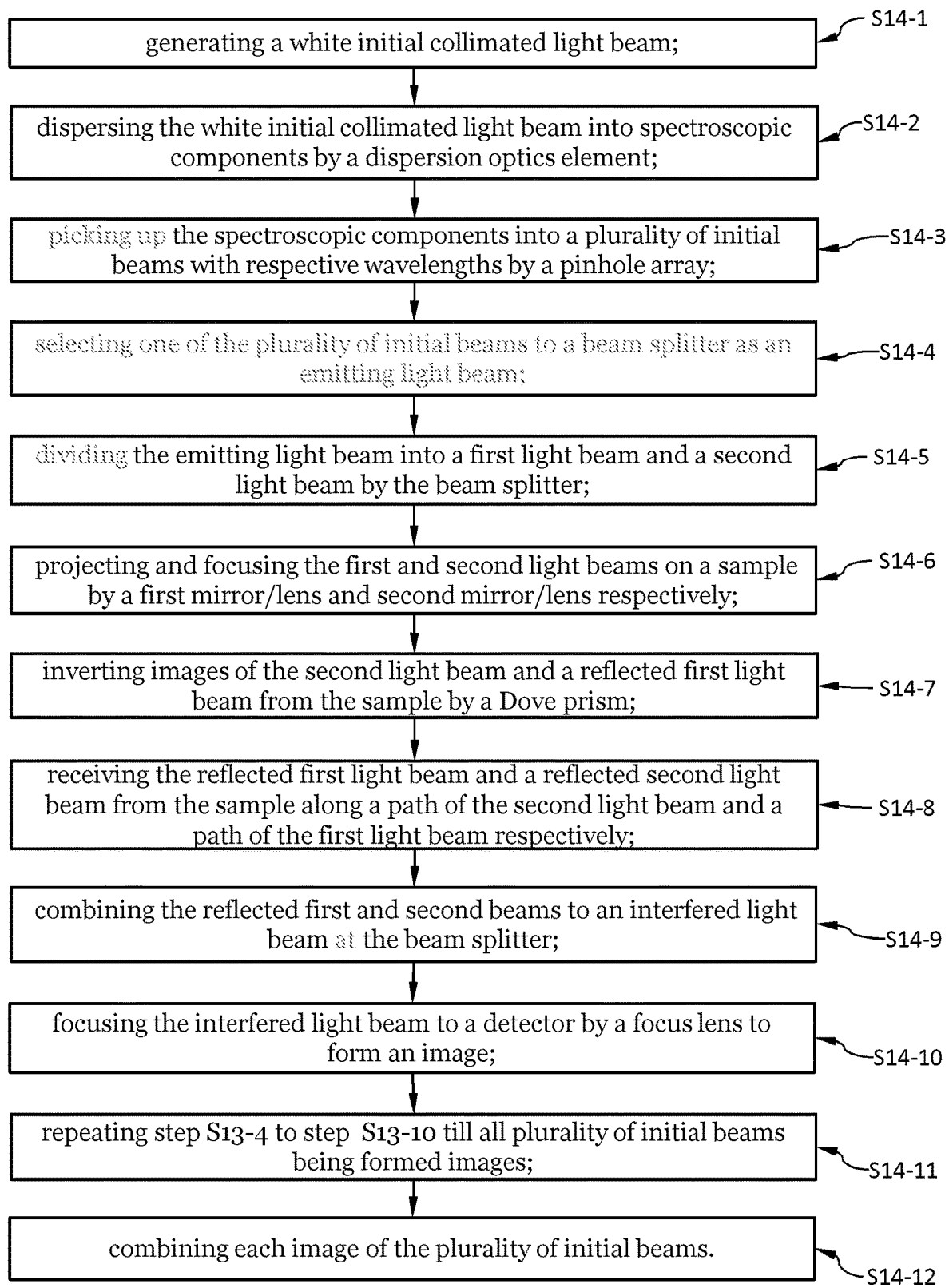
FIG. 14 is a flow chart showing the steps of a method for illuminating a sample by white light source in accordance with another embodiment of the present invention.

The operation of the optical system or self-interferometer by using a white light source, such as embodiment in FIG. 10A, in the present invention can be referred to FIG. 14. A white initial collimated light beam is generated first as shown in step S14-1. The white initial collimated light beam is dispersed into spectroscopic components by a dispersive optics element as shown in step S14-2. The spectroscopic components or individual chromatic light beams are pickup into a plurality of interfered beams with respective wavelengths by a pinhole array, as shown in step S14-3. One of the plurality of initial beams is selected to a beam splitter as an emitting light beam by using a beam block as shown in step S14-4. Then, the emitting light beam is divided into a first light beam and a second light beam by a beam splitter, as shown in step S14-5. The first and second light beams are projected and focused onto a sample by a first and second mirror/lens respectively, as shown in step S14-6. Images of the second light beam and reflected first light beam from the sample are inverted by a Doze prism, as shown in step S14-7. The first light beam and the second light beam are reflected toward a path of the second light beam and a path of the first light beam respectively, as shown in step S14-8. The reflected first light beam and the reflected second light beam are combined or merged at the beam splitter, as shown in step S14-9. The combined, interfered light beam is then focused onto a detector by a focus length, as shown in step S14-10. Step S14-4 to step S14-10 are repeated till all plurality of initial beams being formed images, as shown in step S14-11. And each images of the plurality of initial beams are combined to form a full color image as shown in step S14-12.

Figure 15:
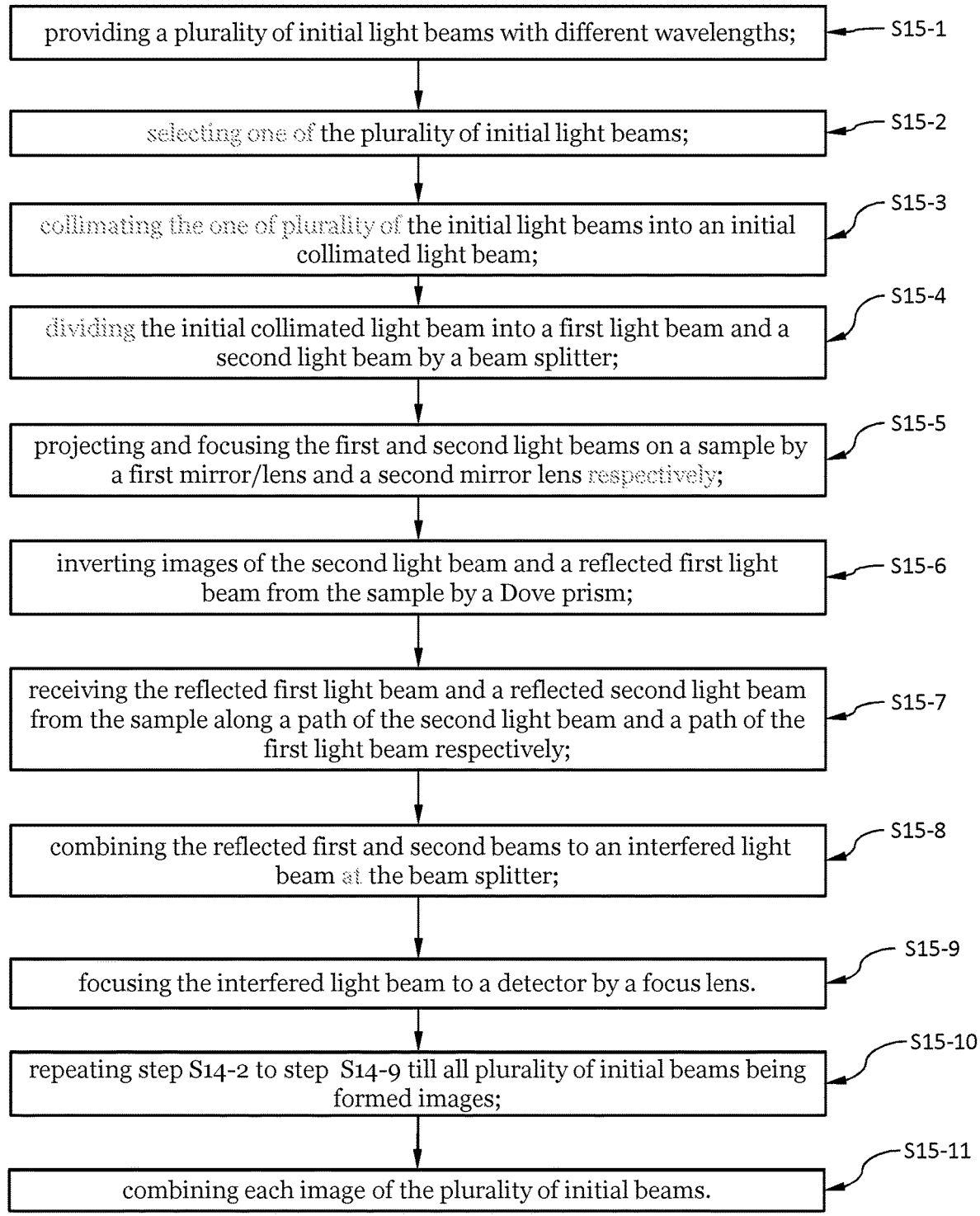
FIG. 15 is a flow chart showing the steps of a method for illuminating a sample by multiple light sources with different wave lengths in accordance with one embodiment of the present invention.

The operation of the optical system or self-interferometer by using a white light source, such as embodiment in FIG. 10, in the present invention can be referred to FIG. 15. A plurality of initial beams with different wavelengths is provided, as shown in step S15-1. Then, one of the plurality of initial light beams is selected, as shown in step S15-2. The one of plurality of the initial light beams is collimated into an initial collimated light beam, as shown in step S15-3.

Then, the initial collimated light beam is divided into a first light beam and a second light beam by a beam splitter, as shown in step S15-4. The first and second light beams are projected and focused onto a sample by a first and second mirror/lens respectively, as shown in step S15-5. Images of the second light beam and reflected first light beam from the sample are inverted by a Dove prism, as shown in step S15-6. The first light beam and the second light beam are reflected toward a path of the second light beam and a path of the first light beam respectively, as shown in step S15-7. The reflected first light beam and the reflected second light beam are combined or merged at the beam splitter, as shown in step S15-8. The combined, interfered light beam is then focused onto a detector by a focus length, as shown in step S15-9. Step S15-2 to step S15-9 are repeated till all plurality of initial beams being formed images, as shown in step S15-10. And each images of the plurality of initial beams are combined to form a full color image as shown in step S15-11.

In summary, the present invention provides an optical system, more particularly to a self-interferometer in optical measurement or inspection, and operation method thereof. This invention can be applied to OCT in bio-medical application. Moreover, this invention can also be applied to defect inspection and metrology in the semiconductor manufacturing industry. Conventional optical inspection tools can't identify defects at 22 nm process node and beyond. This invention can catch defects about 1 nm. In addition, current metrology tool in semiconductor industry is CD-SEM in which only five points of a wafer is probed to represent wafer's process uniformity, but full wafer's critical dimensions can't be measured due to severe low SEM's throughput. In this invention, whole wafer's critical dimension thus can be obtained due to high throughput of optical characteristic. Furthermore, flatness of a thin film surface can also inspected by using present invention.

The present invention provides stable images without very high intensity light source, because both beams for interferometry are used to illuminate sample. That means there is no reference beam and the optical system is simpler in construction. Further, although both LED and LASER can be provided as light source in this invention, the LED has superiority in cost when low coherence interferometry can be easily achieved. In the present invention, dark field image is provided such that image contrast is higher compared with those of the existing technologies. Moreover, by using dispersive optical element, pinhole array, and projector, white light source can be applied to the present invention and full color image can be obtained. For conventional interferometer, vibration is detrimental to the system performance and stability. In contrast, due to there is no reference arm, the self-interferometer in the present invention can be vibration-proof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical system, comprising:
   a low coherent collimated light source for generating an initial light beam;
   a beam splitter, receiving the initial light beam, for generating a first light beam and a second light beam;
   a first mirror for directing the first light beam to a surface region of a sample at a first tilted angle, a second mirror for directing the second light beam to the surface region at a second tilted angle;
   a first lens for focusing the first light beam on the surface region, and a second lens for focusing the second light beam on the surface region,
   wherein the focused first light beam is reflected by the surface region along a path of the second light beam to said beam splitter, and the focused second light beam is reflected by the surface region along a path of the first light beam to said beam splitter, thereby generating an interfered light beam at the beam splitter;
   a Dove prism between said second mirror and said second lens;
   a focus lens for focusing the interfered light beam;
   a detector for receiving the focused interfered light beam to generate an image.

2. The optical system according to claim 1, wherein a first path of the first light beam is symmetrical to a second path of the second light beam.

3. A method for illuminating a sample, comprising steps of:
   generating an initial collimated light beam;

dividing the initial light beam into a first light beam and a second light beam;

projecting and focusing the first and second light beams onto a surface region of the sample;

inverting only images of the second light beam and a reflected first light beam from the surface region;

receiving the reflected first light beam and a reflected second light beam from the sample along a path of the second light beam and a path of the first light beam respectively;

combining the reflected first and second beams to an interfered light beam; and focusing the interfered light beam to a detector.

4. The method according to claim 3, wherein the collimated light beam is a low-coherent light.

5. The method according to claim 4, wherein said generating step provides a white initial light beam, and further comprising steps of:

dispersing the white initial light beam into spectroscopic components;

using a pinhole array to sample the spectroscopic components into a plurality of beams with respective wavelengths; and using a beam block to select one of the plurality of beams to relay to the beam splitter.

6. A method for illuminating a sample, comprising steps of:

generating a white initial collimated light beam;

dividing the white initial light beam into a first light beam and a second light beam;

projecting and focusing the first and second light beams onto a surface region of the sample;

inverting only images of the second light beam and a reflected first light beam from the surface region;

receiving the reflected first light beam and a reflected second light beam from the sample along a path of the second light beam and a path of the first light beam respectively;

combining the reflected first and second beams to an interfered light beam;

dispersing the interfered light beam into spectroscopic components;

using a pinhole array to sample the spectroscopic components plurality of interfered beams with respective wavelengths; and projecting the plurality of beams to a detector.

7. The method according to claim 6, wherein the white initial light beam is a low-coherent light.

8. The method according to claim 7, further comprising a step of combining each image of the plurality of interfered beams projected on the detector to form a full color image.

9. The method according to claim 8, wherein a first path of the first light beam is symmetrical to a second path of the second light beam.

* * * * *